United States Patent [19]

Raghupathi et al.

[11] Patent Number: 6,139,958

[45] Date of Patent: Oct. 31, 2000

[54] CHEMICALLY TREATED GLASS FIBERS FOR REINFORCING THERMOSETTING POLYMER MATRICES

[75] Inventors: Narasimhan Raghupathi, Murrysville; Philip L. Schell, Pittsburgh; James C. Watson, Pittsburgh; David T. Melle, Pittsburgh, all of Pa.

[73] Assignee: PPG Industries Ohio, Inc., Cleveland, Ohio

[21] Appl. No.: 08/196,819

[22] Filed: Feb. 14, 1994

Related U.S. Application Data

[63] Continuation of application No. 07/759,966, Sep. 16, 1991, abandoned, which is a continuation of application No. 07/548,439, Jul. 5, 1990, abandoned, which is a continuation of application No. 07/175,829, Mar. 31, 1988, abandoned.

[51] Int. Cl.$^7$ .............................. D02G 3/00; B32B 9/00
[52] U.S. Cl. ...................... 428/392; 428/375; 428/378; 428/391
[58] Field of Search ...................... 428/375, 378, 428/392, 391, 447; 65/6.41, 6.43, 6.44

[56] References Cited

U.S. PATENT DOCUMENTS

| | | | |
|---|---|---|---|
| 3,449,281 | 6/1969 | Sullivan et al. | 260/292 |
| 3,473,950 | 10/1969 | Wong | 117/66 |
| 3,597,265 | 8/1971 | Mecklenborg et al. | 117/126 GR |
| 3,652,326 | 3/1972 | Ward | 117/126 GE |
| 3,920,313 | 11/1975 | Wong et al. | 350/96 B |
| 3,923,708 | 12/1975 | Furukawa et al. | 260/22 R |
| 3,969,299 | 7/1976 | Burns et al. | 260/29.6 HN |
| 4,029,623 | 6/1977 | Maaghul | 260/29.6 RW |
| 4,065,417 | 12/1977 | Wong et al. | 260/17.4 CL |
| 4,104,434 | 8/1978 | Johnson | 428/273 |
| 4,110,094 | 8/1978 | Motsinger | 65/3 |
| 4,219,457 | 8/1980 | Taniguchi et al. | 260/38 |
| 4,309,326 | 1/1982 | Sage et al. | 260/29.6 NR |

(List continued on next page.)

FOREIGN PATENT DOCUMENTS 1590409  6/1981  United Kingdom .

OTHER PUBLICATIONS

Technical Leaflet No. 211745–1982–MM Savid Chemical Co., Como, Italy, pp. 14–22 and 37–40.
Product Bulletin for Resyn® 1037 from National Starch and Chemical Corp. "Textile Chemicals".

*Primary Examiner*—William Krynski
*Assistant Examiner*—J. M. Gray
*Attorney, Agent, or Firm*—Kenneth J. Stachel

[57] ABSTRACT

Chemically treated glass fibers having good processability are useful in producing fiber reinforced polymeric matrices, wherein the glass fibers have controlled wettability and are not detrimental to the weatherability of the fiber reinforced polymeric matrices. The chemically treated fibers have the dried residue of an aqueous chemical treating composition having a bisphenol A polyester film forming polymer compatible with and soluble in the matrix polymer, poly(vinyl acetate) polymeric film former, acryloxy-containing or methacryloxy-containing organo coupling agent in an effective coupling agent amount, cationic fiberous lubricant in an effective lubricating amount, with or without a cationic organic quaternary ammonium salt having alkoxy moieties, and with water in an amount to give a total solid for the aqueous chemical treating composition in the range of about 1 to about 30 weight percent. In addition, the aqueous chemical treating composition can have one or more amino-containing organofunctional silane coupling agents. The amount of the organic quaternary ammonium agent generally is in the range of from 0.05 to around 0.4 weight percent of the aqueous chemical treating composition. When this agent is not in the aqueous chemical treating composition, a secondary application of an antistatic agent is performed. The chemically treated glass fibers can be produced in any form such as chopped strand or continuous strand for combination with polymeric matrices including both filled and unfilled systems for producing reinforced polymeric matrices such as glass fiber reinforced polymeric panels which can be clear, translucent or pigmented.

5 Claims, 3 Drawing Sheets

U.S. PATENT DOCUMENTS

| | | | |
|---|---|---|---|
| 4,338,234 | 7/1982 | Moore et al. | 523/206 |
| 4,341,877 | 7/1982 | Das et al. | 428/391 |
| 4,358,501 | 11/1982 | Temple | 428/268 |
| 4,394,418 | 7/1983 | Temple | 428/391 |
| 4,394,475 | 7/1983 | Temple et al. | 524/262 |
| 4,424,316 | 1/1984 | DiSalvo et al. | 525/528 |
| 4,435,474 | 3/1984 | Das et al. | 428/391 |
| 4,454,197 | 6/1984 | Laganis et al. | 428/379 |
| 4,461,804 | 7/1984 | Motsinger et al. | 428/288 |
| 4,518,653 | 5/1985 | McWilliams et al. | 428/378 |
| 4,536,447 | 8/1985 | Hsu | 428/392 |
| 4,637,956 | 1/1987 | Das et al. | 428/391 |
| 4,683,254 | 7/1987 | Brannon et al. | 523/503 |
| 4,752,527 | 6/1988 | Sanzero et al. | 428/391 |
| 4,783,509 | 11/1988 | Cavitt et al. | 525/527 |
| 4,789,593 | 12/1988 | Das | 428/391 |
| 4,808,478 | 2/1989 | Dana et al. | 428/392 |

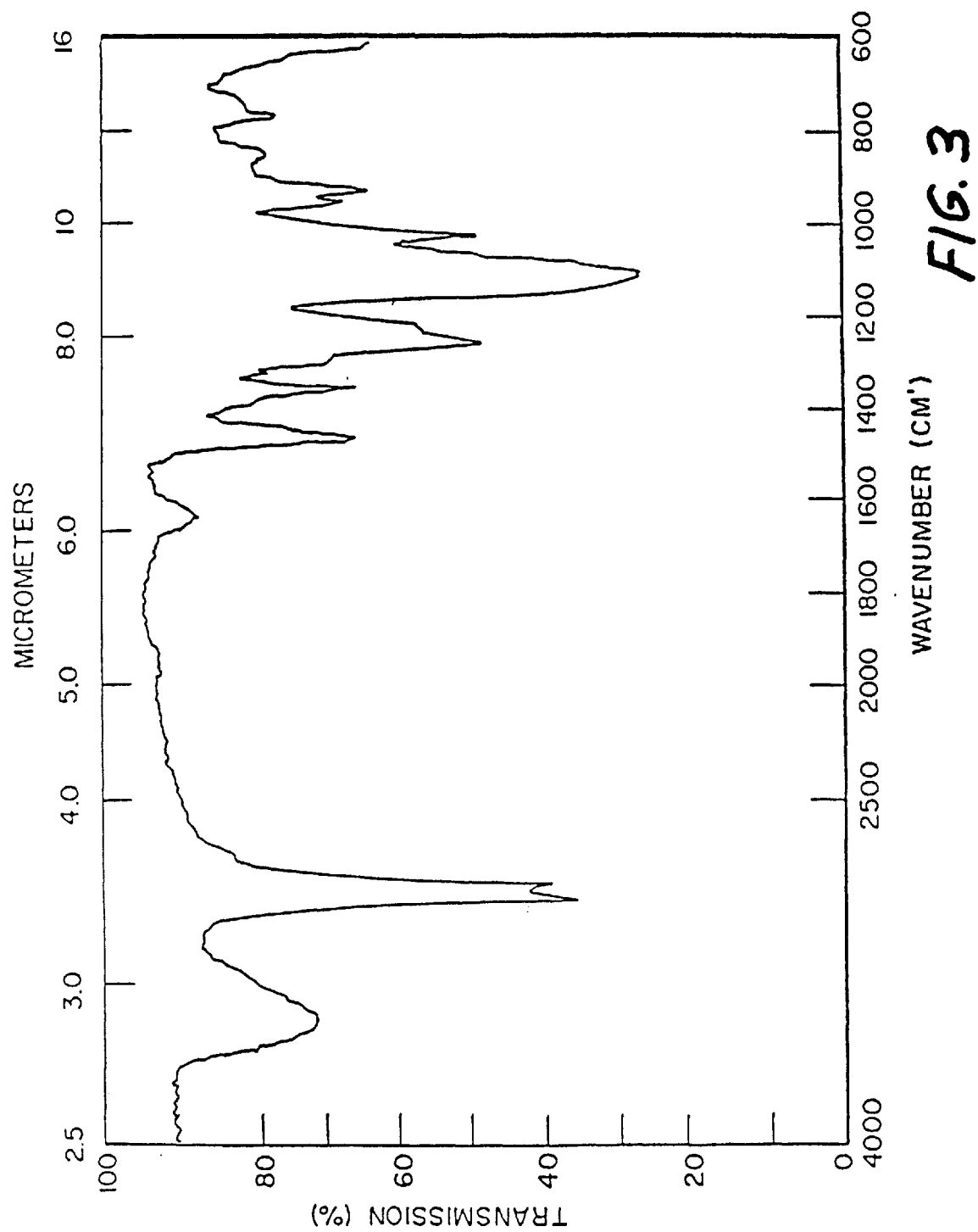

CHEMICALLY TREATED GLASS FIBERS FOR REINFORCING THERMOSETTING POLYMER MATRICES

This application is a continuation of application Ser. No. 07/759,966, filed Sep. 16, 1991 now abandoned, which is a continuation of application Ser. No. 07/548,439, filed Jul. 5, 1990 now abandoned, which is a continuation of application Ser. No. 07/175,829, filed Mar. 31, 1988 now abandoned.

The present invention is directed to chemically treated glass fibers for reinforcing thermosetting polymers to produce fiber reinforced set polymeric articles.

More particularly the present invention is directed to multifilament bundles of glass fibers having a thin coating (size) of a dried residue of an aqueous chemical treating composition. This size enables a more facile wet-out of the fibers in the thermosettable polymer matrix in a non-linear production process for fiber reinforced polymer panels.

The fiber reinforced plastics (FRP) industry uses sized glass fibers in chopped or continuous forms including multifilament bundles or strands, rovings and mats for reinforcing thermoplastic or thermosetting polymers. Allowed patent application entitled "CHEMICALLY TREATED GLASS FIBERS FOR REINFORCING POLYMERIC MATERIALS AND PROCESSES" filed Oct. 30, 1986, having Ser. No. 925,463 now U.S. Pat. No. 4,752,527 and assigned to a common assignee herewith, describes chemically treated glass fibers useful in reinforcing thermosetting polymers. Notably, the reinforced thermosetting polymers are translucent and transparent panels of FRP. Most of these types of products are produced by fairly straight forward processing techniques of chopping the multifilament bundles of treated glass fibers into the thermosettable polymeric matrix on a moving conveyor. This chemically treated glass fiber product has fairly fast wet-out in such polymeric matrices and has found acceptance in this FRP market. When an FRP process does not use a straight or linear travelling conveyor, additional demands are placed on the wet-out properties of the fibers in the polymeric resin. Such processes may not tolerate a wide range of wet-out speed so that slow wetting glass and fast wetting glass may not perform adequately.

Therefore, there is a need to produce a chemically treated fiber having a more controlled wet-out in thermosetting polymeric matrices.

SUMMARY OF THE INVENTION

The aforementioned objects and other objects claimed from the following disclosure are accomplished by the glass fibers having the residue of an aqueous chemical treating composition of this invention. The aqueous chemical treating composition has two film forming polymers the one film forming polymer consisting of a water soluble, emulsifiable or dispersible film forming polymer having a ratio of aliphatic unsaturation to aromatic unsaturation of less than around 0.1 and an amount of aliphatic unsaturation of less than 1.4 double bonds per mole of polymer selected from bisphenol A polyesters and esterified epoxy resin where the esterification is by reaction with carboxylic acids to esterify the epoxy group to form the hydroxy ester and the second film forming polymer is an aqueous soluble, emulsifiable or dispersible poly(vinyl acetate) polymeric material, at least one organofunctional silane coupling agent, at least one fiber lubricant, and at least one cationic organic alkoxylated quaternary ammonium salt and water. The poly(vinyl) polymeric material results in glass fibers treated with this polymeric material having a PEG wet-out value in the range of about 8 to about 14 for 95 percent wet-out or in the range of about 4 to about 8 for 100 percent wet-out. The two film forming polymers are the only film forming polymers present in the aqueous chemical treating composition and are present in a ratio of 99:1 to 1:99. The organofunctional silane coupling agents are selected from alkyl trialkoxysilane with methacryloxy or acryloxy or monoamine or polyamine functionality. The cationic fiber lubricant is one like polyalkylene imines partially amidated with fatty acids at least one of which is pelargonic acid. The amount of the various components in the aqueous chemical treating composition are effective amounts for performing their functions upon application of the aqueous size to the glass fibers as they are formed and wound into a multilayered package and subsequently dried at ambient or elevated temperatures. These effective amounts include a film forming amount for the combination of film formers, effective coupling agent amount for one or more coupling agents and an effective fiber lubricating amount for the lubricant. There is also present on the chemically treated glass fibers an amount of an antistatic agent included in the size and/or subsequently added. One suitable material is an organic quaternary ammonium salt present in the size in an effective lubricating or antistatic agent amount. The amount of water present in the aqueous chemical treating composition is an effective application amount to allow the application of the aqueous chemical treating composition to the glass fibers while they are being formed from molten streams of glass issuing from a glass melting furnace through orifices in a bushing.

BRIEF DESCRIPTION OF THE DRAWINGS

FIG. 3 is an infrared spectrophotometric curve for the antistatic agent that is a cationic organic quaternary ammonium salt having at least one alkoxy moiety that is commercially available under the trade designation NEOXIL® AO-5620 antistatic agent.

DETAILED DESCRIPTION AND PREFERRED EMBODIMENT OF THE PRESENT INVENTION

Chemically treated glass fibers as multifilament strands or roving that are dry chopped for contacting with a thermosetting polymer matrix to produce FRP products on other than straight-line conveyor apparatus demand that the glass fibers wet-out to a sufficient degree before encountering any nonlinearity in the conveyor. "Wet-out" means that the matrix polymer encapsulates the glass fibers and very little, if any, bare glass is visible throughout the cured, fiber reinforced polymeric material. Wet-out during production of the glass fiber reinforced polymeric material is a measure of the apparent intimacy of contact between the polymeric matrix and the glass fibers. If the glass fibers are not intimately wet-out following the application of the glass fibers to the polymeric matrix, this may adversely affect the processability and curing characteristics and surface properties of the final cured fiber reinforced polymeric material.

If too great an amount of wet-out occurs with the glass fibers in the polymeric matrix before the admixture of the glass fibers and the polymeric matrix encounters any nonlinearity in the conveyor transporting the admixture for production, the admixture may not be available on the conveyor to the end of the process for producing the fiber reinforced panel or may cause unevenness in the thickness of the admixture to produce poor FRP panels. Hence, in producing FRP panels, the wet-out of the chopped glass fiber strands or bundles of fibers must occur within not too short a period of time to provide too great an extent of wet-out prior to nonlinearity of the conveyor but within a fairly tight tolerance near the nonlinearity of the conveyor. In this manner the consistency of the admixture is sufficient to hold any nonlinearity to enable the production of good FRP panels. In addition, the chemically treated glass fibers provide low chopper and cot buildup or cling on the panel producing machine when the multifiber strands or rovings are chopped into the matrix polymer moving on the conveyor.

The sized glass fibers of the present invention have the dried residue, via air drying or drying in an elevated temperature, of an aqueous chemical treating composition employing only two film forming polymers in addition to the silane coupling agent, cationic lubricant, and water and possible presence of quaternary ammonium salt compound. The combination of the film forming polymers involves a water soluble, dispersible or emulsifiable thermoplastic bisphenol A polyester film forming polymer having polar functionality and having an equivalent viscosity of less than 10,000 centipoise and having an average amount of aliphatic unsaturation of less than around 1.5 aliphatic double bonds per mole of polymer and having a ratio of aliphatic unsaturation to aromatic unsaturation not to exceed 0.1.

Figure 1:
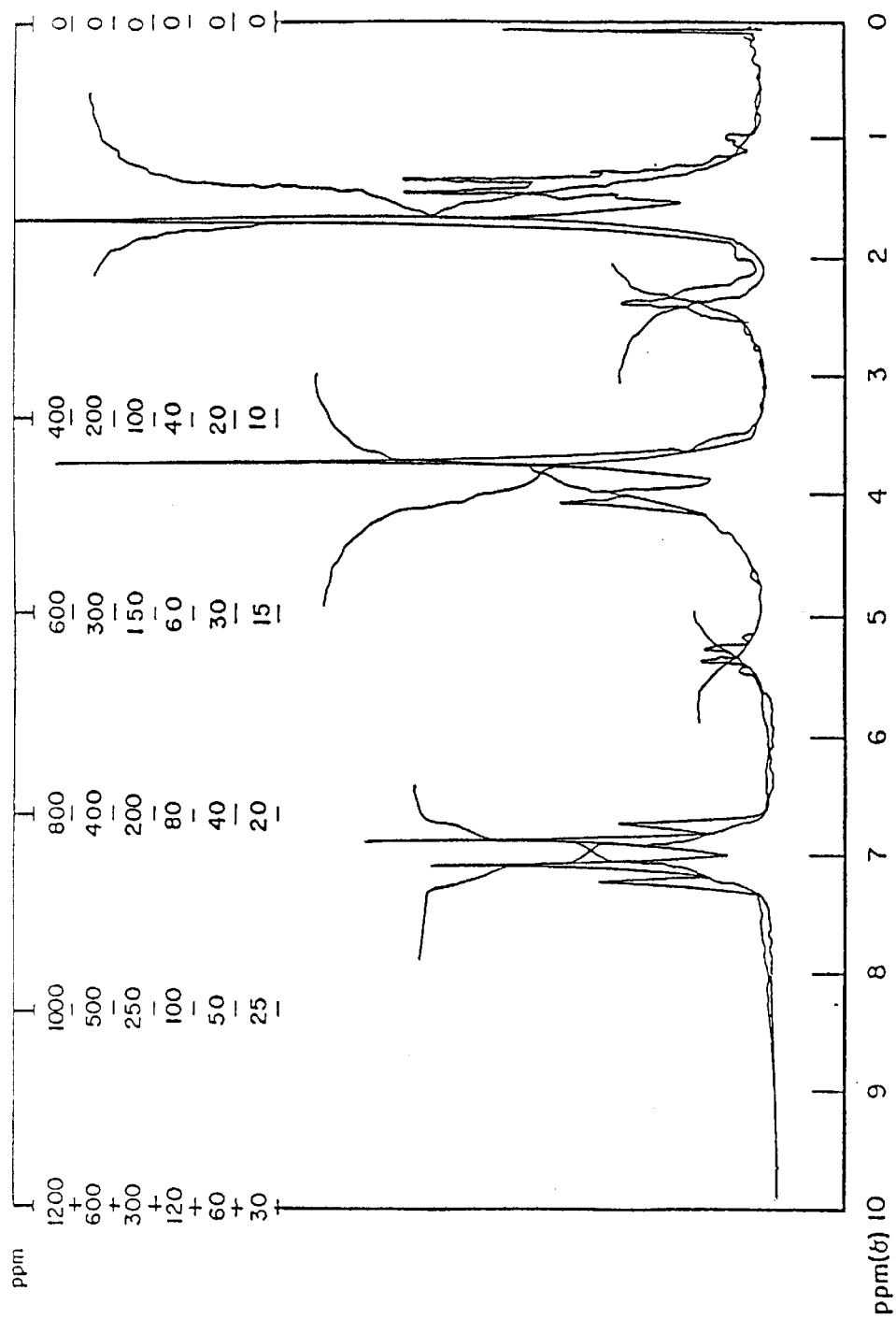
FIG. 1 is a nuclear magnetic resonance curve for an aqueous emulsion of a bisphenol A polyester resin which is commercially available under the trade designation NEOXIL® 954 emulsion from DSM Italia.
Figure 2:
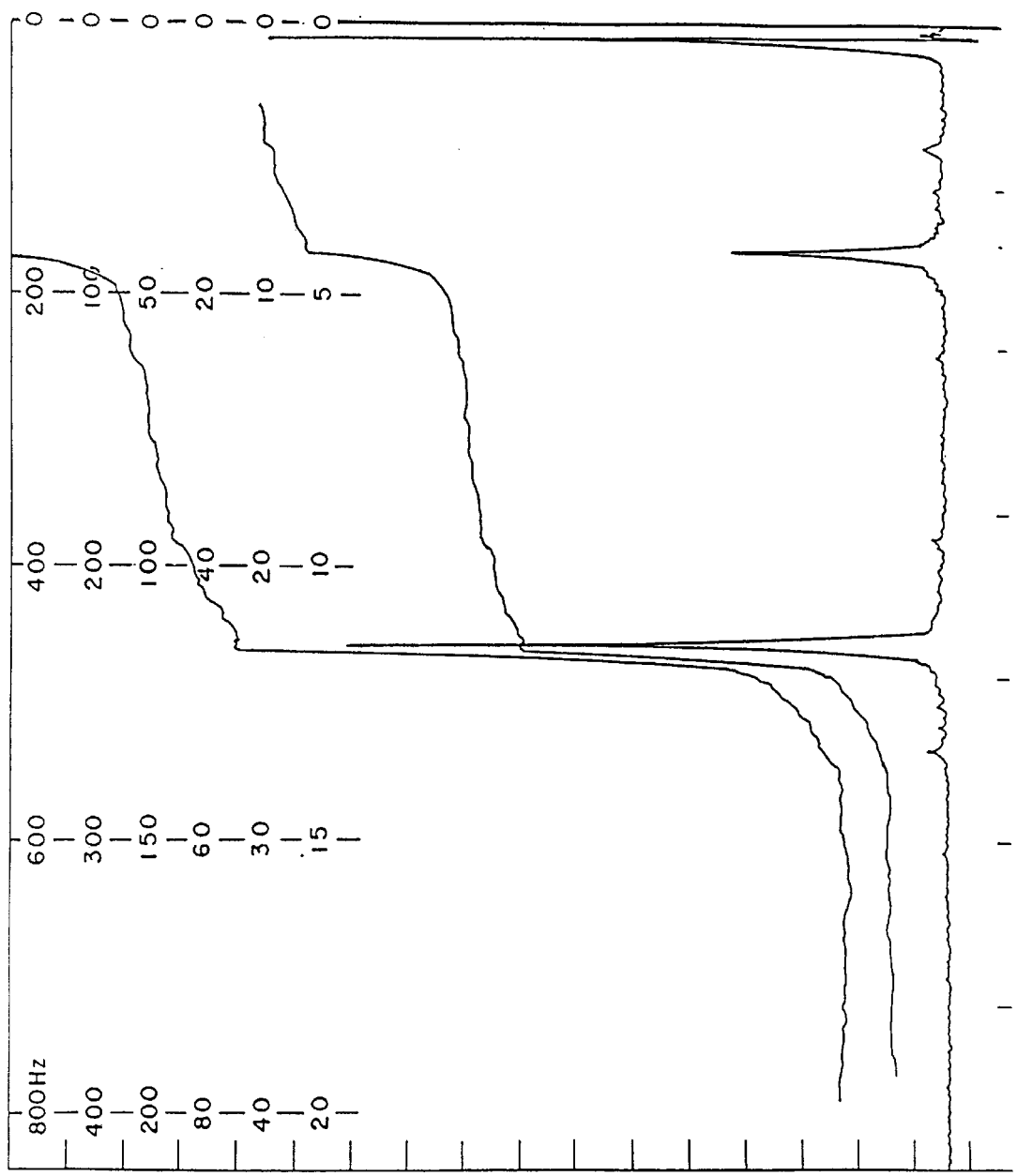
FIG. 2 is a nuclear magnetic resonance curve for the antistatic agent that is a cationic organic quaternary ammonium salt having at least one alkoxy moiety that is commercially available under the trade designation NEOXIL® AO-5620 antistatic agent from DSM Italia formerly Savid Chemical Company, Como, Italy and distributed in the United States by DSM Resins U.S., Inc.

A nonexclusive example of a suitable polar thermoplastic film forming polymer is an aqueous soluble, dispersible or emulsifiable bisphenol A polyester polymer like one formed from bisphenol A, butene diol or maleic anhydride or maleic acid and adipic acid with internal and/or external emulsification through the use of a polyalkylene polyol such as polyethylene glycol. Preferably, the polyester is internally emulsified through ethoxylation for a polymer with a weight average molecular weight in the range of about 30,000 to about 45,000 and has a polydispersity index Mw/Mn of 9 or less and preferably around 5 to around 9. An example of such a polymer is the single aqueous emulsion of alkoxylated bisphenol A polyester resin commercially available under the trade designation NEOXIL® 954 and manufactured by DSM Italia, Como, Italy and which is the reaction product of diglycidyl ether of bisphenol-A and butene diol and adipic acid and maleic anhydride and propylene and ethylene glycols that is essentially free of unreacted epoxy groups. The properties of the NEOXIL® 954 resin are as follows: appearance—milky liquid, solids content—46±3%, pH—3–5, viscosity at 23° C.—2000±500 cps. The aliphatic unsaturation introduced into such a polymer by the butene diol or maleic anhydride or acid should result in aliphatic unsaturation of not more than 1.5 double bonds/mole of polymer. Also, the ratio of aliphatic unsaturation to aromatic unsaturation should be less than 0.1 and preferably around 0.07 or less. The amount of aliphatic unsaturation and the ratio can be controlled by any method known to those skilled in the art of polymerization. For example, the amounts of the various monomers can be controlled in the ratio of monomers with and without aliphatic unsaturation. An NMR curve for the NEOXIL® 954 resin emulsion is shown in FIG. 1. The NMR was performed on a Varian EM-360 MHz proton NMR Spectrometer with a sweep time of 5 minutes and sweep width of 10 ppm and an end of sweep of 0 ppm and a zero reference of tetramethylsilane (TMS) and an ambient sample temperature and with $CDCl_3$ solvent. The amount of the polar thermoplastic film forming polymer in the aqueous treating composition can be in the range of about 1 to about 20 weight percent of the solids of the aqueous treating composition.

Additional nonexclusive examples of bisphenol A polyester resins are those available in an aqueous emulsion form under the trade designation NEOXIL® 952 from DSM Italia. The aqueous emulsion of the NEOXIL® 952 material is an anionic emulsion that has a liquid, milky appearance with a solid content of 40±2 percent and a pH in the range of 4 to 5. The viscosity at 23° C. is 40 to 100 centipoise and the lowest pH threshold value of the thinned emulsion (8 percent solids content) is 4. The NEOXIL® 952 material is very soluble in styrene and compatible with polyester resins. Another example of the film forming polymer is a high molecular weight saturated epoxy ester which is water soluble, emulsifiable or dispersible. Commercially available high molecular weight saturated epoxy ester in a water emulsion is available from DSM Italia Company under the trade designation NEOXIL® 961 material. This material is a nonionic emulsion having a liquid milky appearance and a solids content of 30±2 percent and a pH in the range of 4 to 5.5 with a viscosity at 23° C. of 200 to 500 centipoise and the solid resin has a hydroxyl number of 100±10, an acid number of 10±2 and an epoxy equivalent of 9,000±1,000. Generally, any of the bisphenol A type polyester resins which are soluble, emulsifiable or dispersible in water with anionic, nonionic or cationic emulsifiers can be used as long as their amount of unsaturation is not greater than 1.5 and their unsaturation ratio is less than 0.1. Also, generally, any esterified epoxy resin which is water soluble, emulsifiable or dispersible by anionic, nonionic or cationic emulsifiers can be used as the polar thermoplastic film forming polymer, where the amount of unsaturation and ratio are controlled. The esterification of epoxy resins can be performed by reaction with carboxylic acids to esterify the epoxy group to form the hydroxy ester, although any other reaction known to those skilled in the art for producing epoxy esters or esterifying epoxy resins can be used.

In producing the aforementioned esterified epoxy resins or epoxidized polyester resins, the starting materials in the process are controlled by any method known to those skilled in the art to produce the film forming polymer with an amount of aliphatic unsaturation of 1.5 double bonds/mole of polymer or less and preferably about 1.14 to 1.4 with a ratio of aliphatic unsaturation to aromatic unsaturation of not greater than 0.1. For instance, the monomer raw materials can be used in such ratios that any unsaturated raw material does not contribute to the polymeric material in such a great extent to increase the ratio over 0.1 or to yield an amount of unsaturation of greater than 1.5.

The method of determining the amount of unsaturation per mole of polymer can be any method know to those skilled in the art. For example, numerous wet chemical analytical techniques are known, where the double bonds are hydrogenated, halogenated and the like and the uptake of hydrogen or halogen is measured. The method of determining the ratio can be any method known in the art, but the method of preferably involves utilizing a Fourier transform infrared spectrophotometer (FTIR).

The only other film forming polymer in the aqueous chemical treating composition of the present invention is the vinyl acetate-polymeric material with the resulting PEG wet-out values of about 8 to about 14 at 95% wet-out and about 4 to about 8 at about 100% wet-out. A suitable material is a poly(vinyl acetate silane) copolymer having up to about 1 weight percent of the copolymer as the organosilane. Preferably, the amount of organosilane in the copolymer is around 0.25 weight percent of the copolymer. Larger amounts may be used but without providing any additional advantages. A suitable copolymer is that which is available from National Starch and Chemical Corporation, Bridgewater, N.J., 08807, under the trade designation Resyn 1037 copolymer emulsion. This copolymer is in the form of a precured microgel emulsion, where the copolymer is of vinyl acetate and gamma-methacryloxypropyl-trimethoxysilane and has about 0.25 weight percent of the copolymer as the organosilane. The aqueous emulsion of this copolymer has a solid content of about 55 percent, a pH of 4.7 and an average particle size of around 1 micron and a viscosity measured according to RVF Brookfield No. 2 spindle at 20 rpms at 72° F. (22° C.) of 1225 centipoise and a mechanical stability in a Hamilton Beach mixer at 15 minutes of 10,000 rpm.

The PEG wet-out test is conducted in the following manner.

This method covers the determination of wet-out of rovings when they are pulled at a slow, fixed rate through a metal trough of uncatalyzed resin. Wettability of the roving is measured in terms of a numerical index that reflects the distance traversed by the roving within the trough at the moment complete wet-out occurs. Wet-out is evidenced by complete saturation of the roving strands by the resin, such that the roving "tends to disappear" within the resin.

APPARATUS:

The apparatus consists of a metal trough fitted with steel guide rods spaced at intervals. A large wooden drum mounted at one end of the trough is driven at a fixed speed electric motor. The drum is used to draw the roving through the resin of interest contained by the trough.

Table 3 shows wet-out generally less than that for the commercial sample and good chopping properties for the glass fiber strands of the present invention. The wet-out properties of the glass fiber strands of the present invention enable them to produce fiber reinforced panels on nonlinear conveyor equipment. If deemed necessary, additional antistatic agent can be used on the glass fibers of the present invention either in the aqueous chemical treating composition or as an aftertreatment.

The test sample consists of one or more packages of fiber glass roving. The test specimen consists of a portion of the roving from the sample that is used for the test that is conducted at room temperature. Specimen length is not critical, since the specimen is that portion of the sample drawn through the trough during the test and it remains an integral part of the roving package. The procedure involved:

1. Remove approximately 20 feet of roving from the center of the sample submitted for test and discard.

2. Thread the end of the roving through the guide-eye of the apparatus, and over and under the guide rods and tape to the pulling drum.

3. Fill the trough with polyester resin (or other resin of interest) to a level necessary to cover all the roving on the guide rods. Add resin to the trough when necessary during the test to maintain the level above the roving.

4. Turn the motor on to start drum rotation and make certain that roving feeds smoothly through the trough and onto the take-up drum.

5. Allow the roving to run through the trough and observe the first point along the trough at which the roving completely wets out. Record this position by referencing the number of the guide rod closest to this point. (High numbers indicate rapid wet-out; low numbers reflect slow wet-out of the specimen.)

Other suitable poly(vinyl acetate) polymeric materials include homopolymers or copolymers modified to give the desired PEG wet-out values. Such modifications include introduction of suitable monomers, utilization of particular emulsifiers for homopolymers or copolymers, and similar modifications.

The amounts of these two film forming polymers present in the sizing composition is a ratio in the range of from 99:1 to 1:99 but preferably, the bisphenol A type polyester is present in an amount of at least 40 weight percent of the solids (nonaqueous components) to a predominant amount of the solids. Also, preferably the total amount of both the film forming polymers present in the aqueous chemical treating composition is in the range of around at least 80 weight percent and most preferably around 90 or greater weight percent.

The kind or kinds and amounts of organofunctional silane coupling agents that are present and any quaternary ammonium salt compounds that may be present and its amounts and the amount of water to prepare the aqueous chemical treating composition useful in the present invention are disclosed in patent application Ser. No. 925,463, issued as U.S. Pat. No. 4,752,527 filed Oct. 30, 1986 and entitled "CHEMICALLY TREATED GLASS FIBERS FOR REINFORCING POLYMERIC MATERIALS AND PROCESSES" (Sanzero et al) which is hereby incorporated by references.

In addition to the aforementioned type of organosilane coupling agent employed in the size a monoamino or polyamino organofunctional silane coupling agent can be and preferably is employed.

The monoamino-functional silane coupling agent is one that can be designated by the general formula:

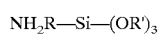

$$NH_2R—Si—(OR')_3$$

wherein R is an alkylene radical having from 2 to 8 carbon atoms and R' is a lower alkyl radical or hydrogen; the lower alkyl radical having 1 to 5 carbon atoms, preferably 1 to 2 carbon atoms. Suitable polyamino silanes have the formula:

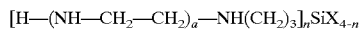

$$[H—(NH—CH_2—CH_2)_a—NH(CH_2)_3]_nSiX_{4-n}$$

wherein n is an integer from 1 to 3, a is an integer from 1 to 5 and X is a readily hydrolyzable group such as an alkoxy with one to four carbon atoms or a halogen. Nonexclusive examples of polyaminosilanes that can be used include:
N-(beta-aminoethyl)-gammaaminopropyltrimethoxysilane,
N-(beta-dimethylaminoethyl)-gammaaminopropyltrimethoxysilane,
N-(beta-aminoethylaminoethyl)-gammaaminopropyltrimethoxysilane,
N-(gamma-aminopropyl)-gammaaminoisobutylmethyldiethoxysilane,
N-(beta-aminoethyl)-gammaaminopropyltrithoxysilane.
With both the acryloxy or methacryloxy organofunctional silane coupling agent and the amino organofunctional silane coupling agent present in the size, the total amount of coupling agent present is generally in the range from around 1 to 6 weight percent of the solids. Otherwise, when only one organofunctional silane coupling agent is present, it is in an amount of up to around 3 weight percent of the solids. With both types of coupling agents present, it is preferred that the coupling agent having unsaturation is in a predominant amount to the aminofunctional silane. Also, it is most preferred that both types of silanes are present in the size and the amount of aminosilane is at least 0.4 weight percent of the solids. Amounts less than this may result in higher chopper buildup and cot buildup amounts.

Preferably, the quaternary ammonium salt is present as a cationic organic alkoxylated quaternary ammonium salt having a formula such as

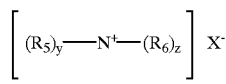

wherein:

$R_5$ is the same alkoxy moiety such as:

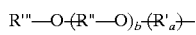

where R' is methylene ($CH_2$) and a is an integer of 1 to 5, and where R" is ethylene and b is an integer from 2 to 8, and where R'" is hydrogen or a methyl group, and wherein y is an integer of 3 or 4, and where when y=3 then z=1 and when y=4 then z=0, and wherein $R_6$ is a long chain alkyl having 6 to 25 carbon atoms, and wherein $X^-$ is $Cl^-$ or $Br^-$, and wherein preferably the acid number of the material is at least 10.

A nonexclusive example of the cationic organic alkoxylated quaternary ammonium salt includes the material commercially available under the trade designation NEOXIL® AO 5620 material available from Savid S.p.A., now DSM-Italia, Como, Italy, and distributed by DSM Resins U.S. This material has a molecular weight of 1010 Mn and 114 Mw, an acid number of 10–20 mgr KOH/p and a pH for 1 percent solution in water of 4–6. Another quaternary ammonium salt that can be used is modified soya-dimethyl ammonium ethosulfate available from PPG Industries, Inc., under the trade designation LAROSTAT™ 264-A antistat. The amount of the organic quaternary ammonium antistat generally is at least an amount of around 0.04 weight percent of the aqueous treating composition. Too large an amount of the organic quaternary ammonium salt may lead to increased chopper cling and is, therefore, detrimental rather than beneficial. Generally, the amount of the organic salt is in the range of about 0.05 to about 04, and preferably around 0.05 to around 0.15 weight percent of the aqueous chemical treating composition for clear translucent panel production. Where filled panels are produced, the amount of the organic salt can range up to the 0.3 or 0.4 weight percent amount.

The aqueous chemical treating composition has a sufficient amount of water to give a total solids for the composition that is sufficient to enable the glass fibers to be treated during their formation with the aqueous chemical treating composition. Generally, the total solids of the aqueous composition is in the range of about 1 to about 30 weight percent and preferably about 3 to about 10 percent. In all events, the amounts of the solid components for an aqueous chemical treating composition should not exceed that amount which will cause the viscosity of the solution to be greater than about 100 centipoise at 20° C. Aqueous solutions having a viscosity of greater than 100 centipoise at 20° C. are very difficult to apply to glass fibers during their formation without breaking the fibers. It is preferred that the viscosity of the size be between 1 and 20 centipoise at 20° C. for best results. Chemical treating compositions with thixotropic gelling or foaming agents can have known viscosities for gels and foams used to treat glass fibers. The pH of the aqueous chemical treating composition is below about 7, and preferably should be in a range of about 4.8 to about 5.2 to maintain the stability of the composition. The aqueous chemical treating composition can be made by combining the components simultaneously or sequentially.

The aqueous chemical treating composition can be applied to any fiberizable glass material such as "E-glass", "621-glass" and low or free boron and/or fluorine derivatives thereof and glass fiber compositions known as "A-glass", "C-glass" and "S-glass". It is preferred when preparing chemically treated glass fibers to be used in the manufacture of clear or translucent polymeric panels that the fiberizable glass composition should result in glass fibers which give a blue hue or cast when they are used to reinforce the acrylic polyester matrix resins. Preferably, the glass fiber compositions give a refractive index for the glass fibers in the range of about 1.5495 to 1.5740. Higher refractive indexes for the glass give an undesirable bronze cast to clear panels reinforced with fibers. Most preferably the refractive index for the glass fibers is in the range of 1.5495 to 1.557.

The aqueous chemical treating composition can be applied to the glass fibers by any method known to those skilled in the art such as during the formation of the glass fibers after the glass fibers have cooled to a sufficient temperature to allow the application of the aqueous chemical treating composition. The aqueous chemical treating composition, typically referred to as a sizing composition, is applied to these glass fibers by applicators having belts, rollers, sprays and the like. The treated glass fibers then can be gathered into one or more strands and collected into a package commonly referred to as a forming package. Also, the glass fibers can be collected into one or more strands and chopped as a wet chopped product. Also, the glass fibers can be gathered into one or more strands and collected as a roving. The glass fibers are dried to reduce their moisture content, and preferably whatever the form of the chemically treated glass fibers, they are dried at temperature and time conditions equivalent to a temperature in the range of about 250° F. (121° C.) to less than 300° F. (149° C.) for 11 hours. The drying can be accomplished in any conventional glass fiber drying oven such as forced air ovens, dielectric ovens, and the like. The dried glass fibers have a dried residue of the aqueous chemical treating composition present on the surfaces of the glass fibers making up the strands. Preferably, the amount of the dried residue on the glass fibers is in the range of about 0.5 to about 1.2 weight percent LOI (loss on ignition).

In the absence of or in addition to an alkoxylated quaternary ammonium salt compound present on the chemically treated glass fiber strand, an antistatic agent can be added in a rewinding or roving operation of the glass fiber strands. A suitable antistatic material is the liquid cationic material available from Emery Industries, Inc., under the trade designation EMERY® 6665 material.

The dried glass fibers having the residue of the aqueous chemical treating composition can be used in any process for producing polymeric reinforced polymers such as saturated and unsaturated polyesters and epoxies and especially such processes that have a non-linear conveyor. One process in which the glass fibers are particularly suitable is a formation of clear or translucent acrylic polymer glass fiber reinforced panels. With the high speed commercial operations used in producing glass fiber reinforced clear and translucent panels, the glass fibers with the dried residue of the aqueous chemical treating composition of the present invention is ideally suited. The glass fibers when chopped have controlled and good wet-out in the polymeric matrix within the limitations of the high speed operation for producing the panels. The glass fibers with the dried residue of the aqueous chemical treating composition can be supplied to such an operation for producing the panels. The glass fibers with the dried residue of the aqueous chemical treating composition can be supplied to such an operation as dry chopped glass fiber strand or as roving which is then chopped into the polymeric matrix which is travelling on a conveyor belt on a releasable substrate such as cellophane. The chopped glass fiber strands are dispersed somewhat uniformly over the polymeric matrix and the glass fibers settle and become wet-out in the polymeric matrix. The glass fiber containing polymeric matrix is then cured in a suitable oven to produce the glass fiber reinforced panels. The panels have good clarity with little fiber prominence. The treated glass fibers of the present invention can be used in translucent, unfilled panel systems and also in filled systems such as those having about 12 to around 50 weight percent calcium carbonate filled, pigmented filled and other filled and unfilled polymeric matrix systems.

In the preferred embodiment of the present invention, glass fibers are attenuated from molten batch and have a refractive index in the range of about 1.554 to 1.557 and have $B_2O_3$ concentration of around 5.2 percent by weight. The glass composition of the glass fibers is preferably in weight percent: $SiO_2$—55.8, CaO—21, $Al_2O_3$—14.8, $B_2O_3$—5.2, $Na_2O$—1.4 and $F_2$—0.5, along with trace amounts of materials usually present from batch compounds used to obtain the aforementioned components of the glass. The glass fibers are coated with the aqueous chemical treating composition during the formation of the glass fibers from a multitude of orifices in a bushing of a glass-melting furnace by a belt type binder applicator.

The aqueous chemical treating composition has as one of the film forming polymers an aqueous emulsion having bisphenol A polyester film forming polymer available under the trade designation Neoxil® 954 polymeric material. The bisphenol A polyester or esterified epoxy film forming polymer has a ratio of aliphatic unsaturation to aromatic unsaturation which is preferably less than 0.1 and which is most preferably around 0.7. The poly(vinylacetate) polymeric material with the moderate wet-out characteristics is poly(vinylacetate-silane) copolymer and it is present in an amount in the range of around 5 to 60 weight percent of the nonaqueous components (solids) of the size. Most preferably, the 1037 copolymer is present in a ratio of amounts with the bisphenol A polyester of around 35 to 45 weight percent of the solids of the copolymer to 55 to 65 weight percent solids of the polyester. The total amount of both film forming polymers present in the chemical treating composition is a predominant amount of the solids of nonaqueous components.

The preferred silane coupling agent is the gammamethacryloxy-propyltrimethoxy silane available from Union Carbide Corporation under the trade designation A174 silane, and the amount of which is preferably less than 0.1 weight percent of the aqueous composition and which is most preferably around 0.07 or the amount of about 2.7 to about 5 weight percent of the solids of the aqueous chemical treating composition. The other preferred silane coupling agent present is the aminopropyltriethoxysilane (A-1100 silane) available from Union Carbide Corporation. This silane is present in an amount of at least 0.4 weight percent solids to an amount less than the other silane. The water soluble cationic glass fiber lubricant is preferably the Emerylube® 6717, which is present in an amount of about 1 to 2.5 weight percent of the solids of the aqueous chemical treating composition. The quaternary ammonium salt is the Larostat 1084 material present in an amount of 0.05 to about 0.4 weight percent of the aqueous treating composition. The water which is present to make up the aqueous chemical treating composition is that amount to give a total solids preferably around 6 to 10 weight percent of the aqueous chemical treating composition. The pH of the aqueous chemical treating composition is preferably in the range of about 4 to about 6. Such a preferred embodiment is illustrated by the treating composition of Example 8 of Table 1, infra.

The aqueous chemical treating composition is prepared by separately hydrolyzing methacryloxypropyltrimethoxy silane and the amino silane in separate premix vessels. The former silane is hydrolyzed with acetic acid in an amount of about 1 milliliter of acetic acid for about 20 grams of the silane and the latter is similarly hydrolyzed with water. The former hydrolyzation is performed by adding the acetic acid to about 10 to 20 weight percent of the water to be used in preparing the chemical treating composition and adding the silane to this mixture with stirring until complete hydrolyzation occurs. The cationic glass fiber lubricant is added to hot water 170° F. (76.7° C.) with stirring where the amount of water is about 1 percent of the total amount of water used in preparing the aqueous chemical treating composition in a premix tank. The aqueous emulsion of the bisphenol A polyester as about 46 percent solids is combined with about twice its weight of water in a main mix tank. The copolymer emulsion having around 42 weight percent solids is combined with twice its emulsion weight in water in a premix vessel and the diluted copolymer is added to the main mixing vessel. The hydrolyzed silane and glass fiber lubricant are added to the main mix tank. Also, the quaternary ammonium salt after a dilution with warm deionized water is added to the main mix tank. An effective antifoaming amount of an antifoaming agent is added to the main mix tank. A small amount of antifoaming agent like SAG 10 can be added and the mix which has been agitated is diluted to the final desired volume with water. A final pH of the aqueous chemical treating composition is adjusted to be in the most preferred range of about 4.0 to about 5.5 with a compatible organic acid such as acetic acid.

Preferably, the aqueous chemical treating composition is applied to green glass having a refractive index of about 1.555 during the formation of the glass fibers where the fibers have a diameter which can range from about $10.3 \times 10^{-5}$ to about $97.5 \times 10^{-5}$ or more inch and preferably is around 35 to $40 \times 10^{-5}$ inch. The aqueous chemical treating composition is applied to the glass fibers to give an add=on of the chemical treating composition in the range of about 0.5 to about 8 percent LOI (Loss on Ignition). The glass fibers are preferably G, H or K fibers gathered into strands to give constructions like G-67 (or H-55 or K-37) strand or the like. The strands of glass fibers are collected on a winder to produce a roving package and a plurality of the roving packages are dried in a Michigan oven at a temperature in the range of about 220° to 300° F. (104–149° C.) for 11 hours. The strands are treated with a second antistatic material and combined into a roving and the roving is used in a process for producing clear or translucent acrylic polyester or epoxy panels by chopping the roving into chopped strands having a length of about ¹⁄₁₆ of an inch to 3 inches, preferably 2 inches. The chopped strands fall into the matrix resin which is present on a moving conveyor with a release substrate such as cellophane separating the matrix from the conveyor belt. The matrix resin containing the chopped glass fiber strand is conveyed to an oven where the panels are heated to cure.

The invention and preferred embodiment are further illustrated by the examples in the following Tables.

Table 1 to produce treated glass fiber samples for each sample of aqueous chemical treating composition. The glass fibers were constructed into glass fiber strands of H-55 or K-37 construction. The strands were wound into multilayered packages and the packages were dried at 260–280° F. temperature and the dried strands were chopped into lengths of about 2.54 centimeters. These dry chopped glass fiber strands were added to acrylic polyester matrix to produce fiber reinforced plastic panels.

TABLE 1

Chemical Treatment Compositions for 10 Gallon (37.85 L) Quantities

| Component | 1 gm (solids) | 2 gms (solids) | 3 gms (solids) | 4 gms (solids) | 5 gms (solids) | 6 gms (solids) | 7 gms (solids) | 8 gms (solids) | 9 gms (solids) | 10 gms (solids) |
|---|---|---|---|---|---|---|---|---|---|---|
| Gamma-methacryloxy-propyltrimethoxy silane (A-174) silane | 117 (3.3) | 117 (3.3) | 117 (3.3) | 117 (3.3) | 117 (3.3) | 117 (3.3) | 117 (3.3) | 117 (3.3) | 117 (3.3) | 117 (3.3) |
| Aqueous emulsion of bisphenol A type polyester polymer in Dowanol (NEOXIL ® 954 resin) | 6090 (80) | 4373 (57.5) | 6041 (79.5) | 4324 (56.8) | 5243 (68.9) | 5172 (68) | 6416 (84.5) | 3999 (52.5) | 5207 (68.5) | 3494 (45.9) |
| Poly(vinyl acetate) silane copolymer aqueous emulsion (1037 emulsion) | 849 (12) | 2436 (34.8) | 803 (11.5) | 2390 (34.1) | 1652 (23.6) | 1587 (22.6) | 496 (7.09) | 2743 (39.1) | 1620 (23.1) | 3230 (46.1) |
| Amino organo-functional silane (A-1100 silane) | 42.8 (0.7) | 42.8 (0.7) | 117.7 (2) | 117.7 (2) | 26.8 (0.46) | 133.8 (2.3) | 80.3 (1.4) | 80.3 (1.4) | 80.3 (1.4) | 58.6 (1) |
| Cationic glass fiber lubricant (EMERY ® 6717 lubricant) | 46.6 (1.3) | 46.6 (1.3) | 46.6 (1.3) | 46.6 (1.3) | 46.6 (1.3) | 46.6 (1.3) | 46.6 (1.3) | 46.6 (1.3) | 46.6 (1.3) | 46.6 (1.3) |
| Organic quaternary ammonium antistat NEOXIL ® AO-5620 | 87.4 (2.4) | 87.4 (2.4) | 87.4 (2.4) | 87.4 (2.4) | 87.4 (2.4) | 87.4 (2.4) | 87.4 (2.4) | 87.4 (2.4) | 87.4 (2.4) | 87.4 (2.4) |
| Water | To 10 Gallons | | | | | | | | | |

Table 1 shows ten samples of aqueous chemical treating compositions useful in the present invention. The chemical compositions were prepared in a manner similar to that for the preferred embodiment.

Glass fibers having the glass composition of the preferred embodiment and having filament diameters of H or K were treated with the aqueous chemical treating compositions of Table 2 presents performance results of the panels and also shows the composition of the panels in regards to glass content, resin content and filler content. The performance properties are the tests conducted on samples of the panels. Compared to the panel prepared with commercially available glass fiber, panels having a lower glass content produce comparable strength properties.

TABLE 2

Performance Results

| Filled Resin Reinforced With Glass Fibers Treated With Formulation of Table 1 | Glass Content | Resin Content | Filler Content | Flex Dry | % Cov Flex | Flex Mod | % Cov Mod | Tensile Dry | % Cov Tensile | Tensile Wet | % Cov Tensile | IZOD Impact | % Cov Izod |
|---|---|---|---|---|---|---|---|---|---|---|---|---|---|
| 7 | 22.2 | 32.5 | 45.3 | 28.3 | 8.25 | 1.96 | 6.69 | 11.1 | 12.2 | 10.40 | 15.20 | 9.24 | 16.30 |
| 8 | 22.1 | 33.7 | 44.2 | 31.2 | 9.11 | 1.98 | 4.56 | 12.2 | 15.4 | 11.20 | 6.03 | 8.30 | 12.50 |
| 9 | 23.6 | 32.8 | 43.7 | 25.7 | 8.00 | 1.93 | 5.95 | 11.1 | 7.9 | 9.77 | 6.94 | 7.12 | 12.40 |
| 10 | 20.9 | 33.5 | 45.8 | 34.4 | 12.70 | 1.95 | 14.20 | 12.2 | 15.9 | 11.80 | 7.46 | 8.32 | 16.30 |
| Commercial Control | 24.9 | 33.0 | 42.2 | 32.5 | 11.30 | 1.99 | 6.16 | 13.8 | 16.2 | 12.70 | 14.70 | 9.49 | 9.98 |

% Cov = percent coefficient of variation
Flex = flexural strength in psi
Flex Mod = flexural modulus in psi
Mod = middle of sample
Tensile Dry = dry tensile strength in psi
Tensile Wet = wet (before drying) tensile strength in psi Table 3 shows PEG wet-out and chopping performance of K-37 strands for each of the listed aqueous chemical treating compositions of Table 1. The tests were also conducted on commercially available glass fiber strands.

TABLE 3

Strand K-37 Wet-Out and Chopping Performance

| Glass Fibers With Chemical Treatment of Table 1 | Peg Wet-Out 95%/100% Avg. of 10 Sets | Chopper Build-Up | Cot Build-Up |
|---|---|---|---|
| 1 | 15.5/9.3 | Slight | Slight |
| 2 | 12/6.8 | Slight | Slight |
| 3 | 9.8/3.7 | None | Slight |
| 4 | 12.7/6.5 | Very Slight | Slight |
| 5 | 13.5/7.3 | Moderate | Moderate |
| 6 | 11.2/3.7 | Very Slight | Very Slight |
| 8 | 13.2/6.3 | Very Slight | Very Slight |
| 9 | 16/9.7 | None | Very Slight |
| 10 | 11/5.5 | Very Slight | Slight |
| 10 | 11.8/5.8 | None | None |
| Commercial | 14.2/9.3 | Slight | Very Slight |

We claim:

1. Glass fiber strand having a plurality of glass fibers, comprising:
   I. glass fibers having a refractive index in the range of about 1.54 to about 1.57 selected from the group consisting of 1) oxides of borosilicates, 2) aluminum borosilicates, 3) alkali metal alkaline earth metal borosilicates, and alkali metal alkaline earth metal aluminum borosilicates,
   II. dried residue of an aqueous chemical treating composition present on at least a portion of the surfaces of the glass fibers, comprising:
      a) only two film forming polymers including:
         i) an aqueous emulsion or dispersion of bisphenol A polyester film forming polymer and having internal emulsification through ethoxylation and having a weight average molecular weight in the range of about 30,000 to 45,000 and having a polydispersity index of around 5–9 and having an amount of aliphatic unsaturation of less than 1.5 double bonds/mole of polymer and a ratio of aliphatic to aromatic double bonds of less than 0.1, and
         ii. aqueous emulsion, dispersion or solution of poly(vinylacetate-silane)copolymer, where the amount of organosilane in the copolymer does not exceed about 1 weight percent of the copolymer, where (i) is present in an amount of at least 40 weight percent of the nonaqueous components and (ii) is present in an amount of around 5 to around 60 weight percent of the nonaqueous components, where both nonaqueous components are of the aqueous chemical treating composition;
      b) organo coupling agent selected from the group consisting of acryloxy-containing and methacryloxy-containing coupling agents present in an amount in the range of about 0.5 to about 10 weight percent of the aqueous chemical treating composition,
      c) amino organosilane coupling agent selected from the group consisting of aminoalkyltrialkoxysilane, and polyamino organofunctional silane coupling agents present in an amount of at least 0.4 weight percent of the nonaqueous components and in a lesser amount to that of the acryloxy or methacryloxy-containing silane where all the silanes include hydrolyzed derivatives thereof,
      d) polyamino amide cationic lubricant which is a partially amidated polyalkylene amine prepared through condensation with fatty acids, where at least one of the fatty acids is pelargonic acid present in an amount in the range of about 0.05 to about 0.5 weight percent of the aqueous chemical treating composition,
      e) cationic quaternary ammonium salt having alkoxy moieties and having an acid number of at least 10 and present in an amount in the range of about 0.05 to about 0.4 weight percent of the aqueous treating composition,
      f) water in an amount to give a total solids of the aqueous chemical treating composition in the range of about 1 to about 20 weight percent, and wherein the aqueous chemical treating composition is essentially free of inorganic antistatic agents, and where the pH of the aqueous chemical treating composition is below about 7.

2. Glass fiber strands of claim 1 also having a second antistatic agent added to the strands subsequent to the application of the aqueous chemical treating composition.

3. Glass fiber strands of claim 1, wherein the polyvinylacetate-silane copolymer is a copolymer of vinyl acetate and gamma-methacryloxypropyltrimethoxysilane having about 0.25 weight percent of the copolymer as the organosilane and is present as an aqueous emulsion having a solids content of about 55 percent.

4. Glass fiber strands of claim 1, wherein the total amount of both film forming polymers present in the aqueous chemical treating composition is at least 80 weight percent.

5. Glass fiber strands of claim 1, wherein the amount of the polyvinylacetate-silane copolymer present in the aqueous chemical treating composition is 46.1 weight percent of the solids of the treating composition.

* * * * *